Patented Nov. 14, 1939

2,179,895

UNITED STATES PATENT OFFICE 2,179,895

DYESTUFFS OF THE METHINE SERIES

Werner Müller, Cologne-on-the-Rhine, and Carl Berres, Leverkusen-Wiesdorf, Germany, assignors to General Aniline Works, Inc., New York, N. Y., a corporation of Delaware No Drawing. Application April 18, 1936, Serial No. 75,226. In Germany April 26, 1935

6 Claims. (Cl. 260—465)

The present invention relates to new dyestuffs, more particularly it relates to dyestuffs of the methine series which may be represented by the probable general formula:

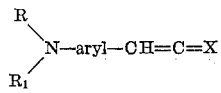

In the said formula R stands for halogenalkyl, $R_1$ stands for hydrogen, alkyl, halogenalkyl, hydroxyalkyl, alkoxyalkyl, aralkyl or aryl. The grouping $=C=X$ stands for the radical of a compound containing a reactive methyl or methylene group, in which the $=C=$ portion is formed from the reactive methyl or methylene group, and the group

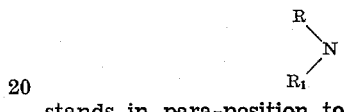

stands in para-position to

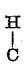

The new dyestuffs are obtainable by condensing according to the methods known per se a compound with a reactive methylene group with a para-aminoarylaldehyde of the general formula:

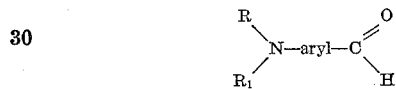

wherein R and $R_1$ mean the same as stated above. The aldehydes used as starting components in the said process have been described, e. g., in the co-pending application for Letters Patent entitled "Nitrogenous aromatic aldehydes", Serial No. 72,448 filed April 2, 1936, now issued as United States Patent No. 2,141,090 dated December 20, 1938.

As further aldehydes suitable for the manufacture of our new dyestuffs there may be mentioned by way of example para-(phenylmethyl)-aminobenzaldehyde and para-(ethoxyphenylmethyl)-aminobenzaldehyde.

As suitable compounds with reactive methylene groups there may be mentioned, for example, derivatives of cyanacetic acid, such as their esters, and amides, further derivatives of malonic acid, such as malonic nitrile, malonic ester, or the like, pyrazolones, indolines, alpha-methylindolines, alpha- and gamma-alkylpyridines, alkylquinoline, oxythionaphthene, diketohydrindene, acetophenone, dinitrotoluene and so on.

The new dyestuffs have a number of technical advantages in comparison with the analogous polymethines hitherto known. In this process, by the presence of halogenalkyl radicals in the dyestuff molecule, a strong displacement of the shade to the short-wave side of the spectrum is effected, so that tints are obtained that could not be produced so far in this manner. Further the presence of hydroxyalkyl radicals effects in part an essential improvement of the solubility of the dyestuffs, so that particularly dark and abundant dyeings are obtainable. Likewise by halogenalkyl, hydroxyalkyl and aryl radicals the fastness to sublimation and to light are improved, particularly in dyeings on acetate silk, and often in a very essential degree. Our new dyestuffs are also suitable for sensitive silver halide emulsions.

In this manner, new and very clear basic dyestuffs are obtainable, which according to the components employed, are suited for different purposes, as for instance for solvents, for the dyeing of cellulose ethers and esters, for the manufacture of beautiful fast lakes on textiles and substrata, and also as leather dyestuffs.

The invention is illustrated by the following examples, without being restricted thereto:

*Example 1.*—24 parts by weight of para-butylchloroethylaminobenzaldehyde are refluxed for a short time in about 100 parts by weight of alcohol with 11 parts by weight of cyanacetic acid ethylester and a few drops of piperidine. After cooling, the dyestuff crystallizes in greenish yellow needles, which fuse, after filtering with suction and drying, at 111–113° C. The dyestuff having the following formula:

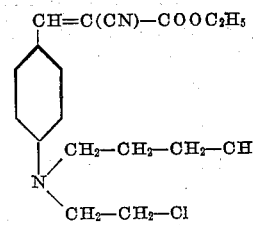

is insoluble in water, easily soluble in alcohol, acetone, ethyl acetate or the like. The dyestuff dyes acetate silk light greenish yellow tints of excellent fastness to light and sublimation. The tint is more greenish than that of the analogous dyestuff manufactured from para-diethylaminobenzaldehyde. The above specified fastness properties are essentially better.

The dyestuff manufactured in the same manner from 1 mol of para-chlorethyl-methylaminobenzaldehyde+1 mol of cyanacetic acid ethylester has a melting point of 108° C.; it dyes acetate silk light greenish yellow shades of similar fastness properties. The dyestuff corresponds to the following formula:

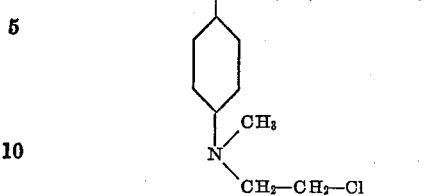

The dyestuff from para-di-(chlorethyl)-aminobenzaldehyde+cyanacetic acid ethyl ester separates in light greenish yellow needles of the melting point 171° C. It is easily soluble in hot alcohol, less soluble in the cold. The dyestuff corresponds to the following formula:

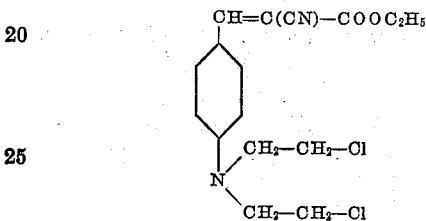

*Example 2.*—26 parts by weight of para-(para'-ethoxyphenylmethyl) aminobenzaldehyde are refluxed for a short time in 250 parts by weight of alcohol with about 11 parts by weight of cyanacetic acid ethyl ester and a few drops of piperidine. After addition of about 100 parts by weight of water and cooling, the dyestuff crystallizes in small yellow needles of the melting point 90–91° C. which are easily soluble in alcohol, acetone, ethyl acetate or the like, and which dye cellulose ethers light orange yellow deep shades of good fastness to light and sublimation. The dyestuff corresponds to the following formula:

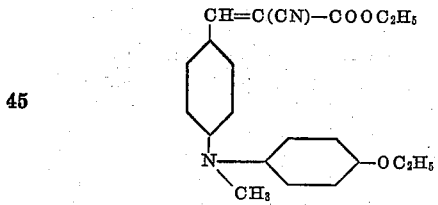

The dyestuff from the same aldehyde+malonic acid—dinitrile is easily soluble in hot alcohol, less soluble in the cold, and it crystallizes therefrom in light orange needles of the melting point 107–109° C. The dyestuff corresponds to the following formula:

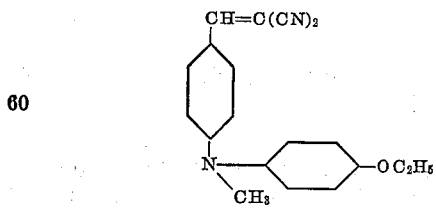

*Example 3.*—18 parts by weight of para-methyl-hydroxyethylamino-benzaldehyde are refluxed for a short time in about 50 parts by weight of alcohol with 11 parts by weight of cyanacetic acid ethyl ester and a few drops of piperidine, and then the alcohol is distilled off.

An orange yellow resin is obtained, which soon hardens to fine yellow crystals, which, after recrystallizing from alcohol, fuse at 93° C. The dyestuff is extraordinarily easily soluble in alcohols, acetone, ethyl acetate and the like. It dyes acetate silk excellently in light greenish yellow shades of good fastness properties. The dyestuff corresponds to the following formula:

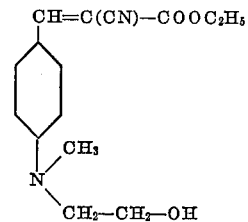

The yellow dyestuff of the melting point 136–137° C. manufactured in the same manner from 1 mol each of para-hydroxy-ethylchlorethyl-amino-benzaldehyde and cyanacetic acid ethyl ester dyes acetate silk light greenish yellow shades of good fastness properties. The dyestuff corresponds to the following formula:

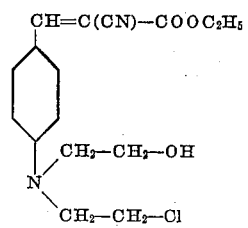

*Example 4.*—20 parts by weight of para-chlorethyl-methylamino-benzaldehyde+17.5 parts by weight of 1-phenyl-3-methyl-5-pyrazolone are refluxed, for a short time, in 50 parts of alcohol, after the addition of a few drops of piperidine. After cooling, there crystallize from the red solution bright red crystals of the dyestuff, which fuse at 154° C. and dye acetate silk orange shades of very good fastness properties. The dyestuff corresponds to the following formula:

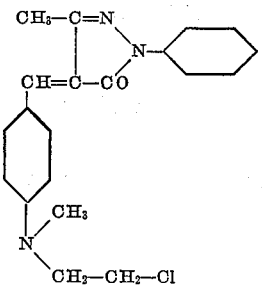

*Example 5.*—24.6 parts by weight of para-di-(chlorethyl)-amino-benzaldehyde are heated during 5 hours at 100° C. with 13.1 parts by weight of methylketol in 65 parts by weight of glacial acetic acid. After water is added to the reaction mass, the condensation product separates first as a resin, soon solidifying, however, to a violet crystalline powder, which easily dissolves in alcohol, acetone or the like with a reddish violet coloration. The dyestuff corresponds to the following formula:

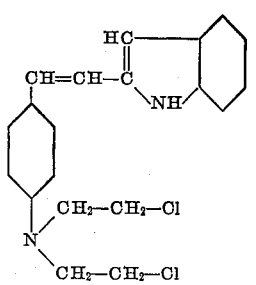

*Example 6.*—24.6 parts by weight of para-di- (chlorethyl)-amino-benzaldehyde are refluxed during 30 minutes with 15.7 parts by weight of 3-oxythionaphthene and a few drops of piperidine in 250 parts by weight of alcohol. The condensation product separates in orange leaflets of the melting point 214° C. The dyestuff corresponds to the following formula:

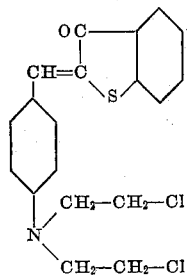

*Example 7.*—24.5 parts by weight of para-di-(chlorethyl)-amino-benzaldehyde are refluxed for some hours at 100° C. with 17.5 parts by weight of 1,3,3-trimethyl-2-methylene-indoline in 120 parts by weight of glacial acetic acid. After pouring the reaction mass into water and salting out with sodium chloride, the dyestuff is obtained as a dark bronze resin, which soon hardens to splendid bright crystals. By recrystallizing from hot water, the pure dyestuff of the following formula

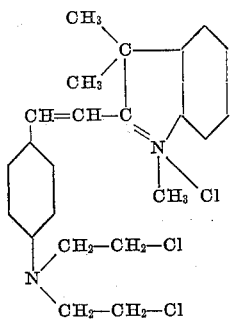

is obtained. With complex phosphotungstic acids or the like, it gives a light bluish red colour lake of good fastness properties. The shade is essentially more reddish than that of the analogous dyestuff from, for instance, para-diethylamino-benzaldehyde+1,3,3-trimethyl-2-methylene-indoline. The dyestuff likewise dyes very clear shades on cellulose ether and ester, and on leather.

The dyestuff obtained in the same manner from 1 mol of para-methylchlorethyl-amino-benzaldehyde + 1 mol of 1,3,3-trimethyl-2-methylene-indoline separates in beautiful easily soluble crystals with blue luster on the surface, and it gives more bluish dyeings than the dyestuff described above. The dyestuff corresponds to the following formula:

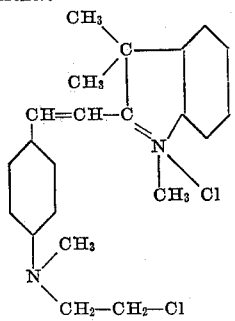

*Example 8.*—22.5 parts by weight of para-ethylchlorethyl-amino-ortho-tolyladehyde are heated together with 17.5 parts by weight of 1,3,3-trimethyl-2-methylene indoline in 70 parts by weight of glacial acetic acid to 100° C. during some hours, and the reaction mixture is worked up in accordance with the directions given in Example 7. There is obtained an easily soluble dyestuff in steel-blue crystals yielding light violetish red dyeings. The dyestuff corresponds to the following formula:

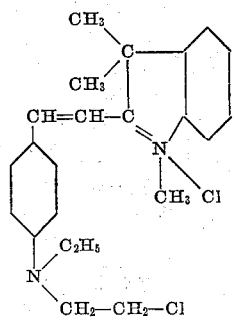

Similar but somewhat more reddish shades are obtained with the dyestuff from 1 mol of para-n-butylchlorethyl-amino-ortho-chlorobenzaldehyde + 1,3,3-trimethyl-2-methylene-indoline. The dyestuff corresponds to the following formula:

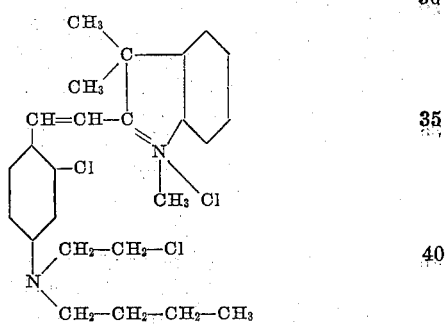

*Example 9.*—21 parts by weight of para-methyl-beta-chloro-n-propylamino-benzaldehyde and 17.5 parts by weight of 1,3,3-trimethyl-2-methylene-indoline are condensed in the manner described in 60 parts by weight of glacial acetic acid to a dyestuff separating in beautiful bluish iridescent crystals. It is easily soluble in water, alcohol and the like, and, with regard to its properties corresponds nearly to the dyestuffs described in the Examples 7 and 8, yielding bluish pink dyeings of excellent clearness. The dyestuff corresponds to the following formula:

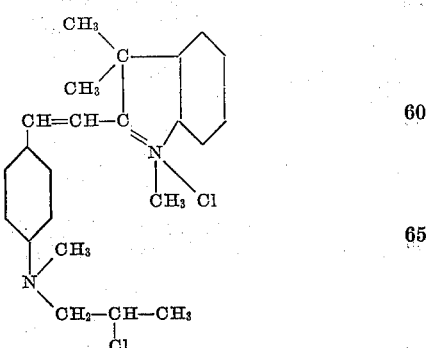

*Example 10.*—26 parts by weight of para-(para-ethoxyphenylmethyl) amino-benzaldehyde are heated together with 24 parts by weight of 1-ethyl-3,3-dimethyl-2-methylene-alpha-naphthindolene in 75 parts by weight of glacial acetic acid to 100° C. for some hours. The reaction mixture is poured into water and salted out with a saturated solution of sodium phosphate. In this manner there is obtained the dyestuff in green crystals, which are easily soluble in water. The dyestuff dyes, e. g., acetate silk deep violet shades of very good fastness properties. The dyestuff corresponds to the following formula:

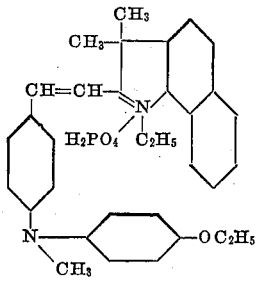

We claim:
1. Dyestuffs of the general formula

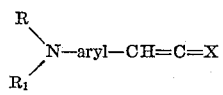

wherein R stands for halogenalkyl, $R_1$ stands for a member selected from the group consisting of hydrogen, alkyl, halogenalkyl, hydroxyalkyl, alkoxyalkyl, aryl and aralkyl, the grouping =C=X stands for the radical of a compound containing a reactive group selected from the class consisting of reactive methyl and reactive methylene groups, in which the =C= portion is formed from the said reactive group, and the group

stands in para-position to CH, yielding in general clear shades on cellulose acetate silk.

2. Dyestuffs of the general formula

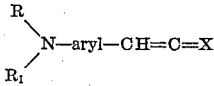

wherein R stands for a halogenalkyl, $R_1$ stands for a member selected from the group consisting of hydrogen, alkyl, halogenalkyl, hydroxyalkyl, alkoxyalkyl, aryl and aralkyl, the grouping =C=X stands for the radical of a compound containing a reactive group selected from the class consisting of reactive methyl and reactive methylene groups, in which the =C= portion is formed from the said reactive group, said compound being selected from the group consisting of cyanacetic acid esters, cyanacetic acid amides, malonitrile and alpha-methylindolines, and the group

stands in para-position to CH, yielding in general clear shades on cellulose acetate silk.

3. Dyestuffs of the general formula

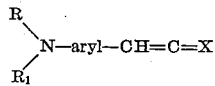

wherein R and $R_1$ stand for chlorethyl, the grouping =C=X stands for the radical of a compound containing a reactive group selected from the class consisting of reactive methyl and reactive methylene groups, in which the =C= portion is formed from the said reactive group, said compound being selected from the group consisting of cyanacetic acid esters, cyanacetic acid amides, malonitrile and alpha-methylindolines, and the group

stands in para-position to CH, yielding in general clear shades on cellulose acetate silk.

4. The dyestuff of the formula:

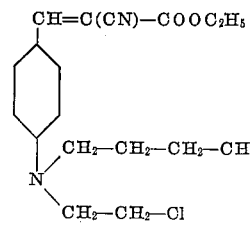

dyeing acetate silk light greenish yellow tints of excellent fastness to light on sublimation.

5. The dyestuff of the formula

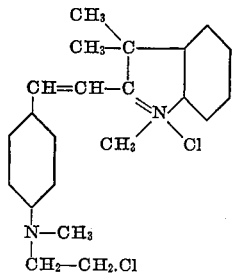

dyeing acetate artificial silk light bluish-red shades.

6. The dyestuff of the formula

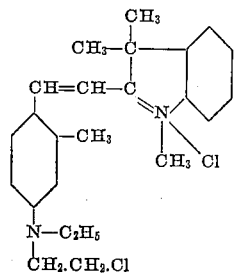

dyeing acetate artificial silk light violetish red shades.

WERNER MÜLLER.
CARL BERRES.

Certificate of Correction

Patent No. 2,179,895. November 14, 1939.

WERNER MÜLLER ET AL.

It is hereby certified that error appears in the printed specification of the above numbered patent requiring correction as follows: Page 3, second column, lines 15 to 20 inclusive, for that portion of the formula reading

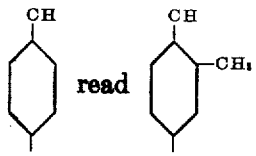

and that the said Letters Patent should be read with this correction therein that the same may conform to the record of the case in the Patent Office.

Signed and sealed this 9th day of April, A. D. 1940.

[SEAL]

HENRY VAN ARSDALE,
*Acting Commissioner of Patents.*